※United States Patent Office 3,699,044
Patented Oct. 17, 1972

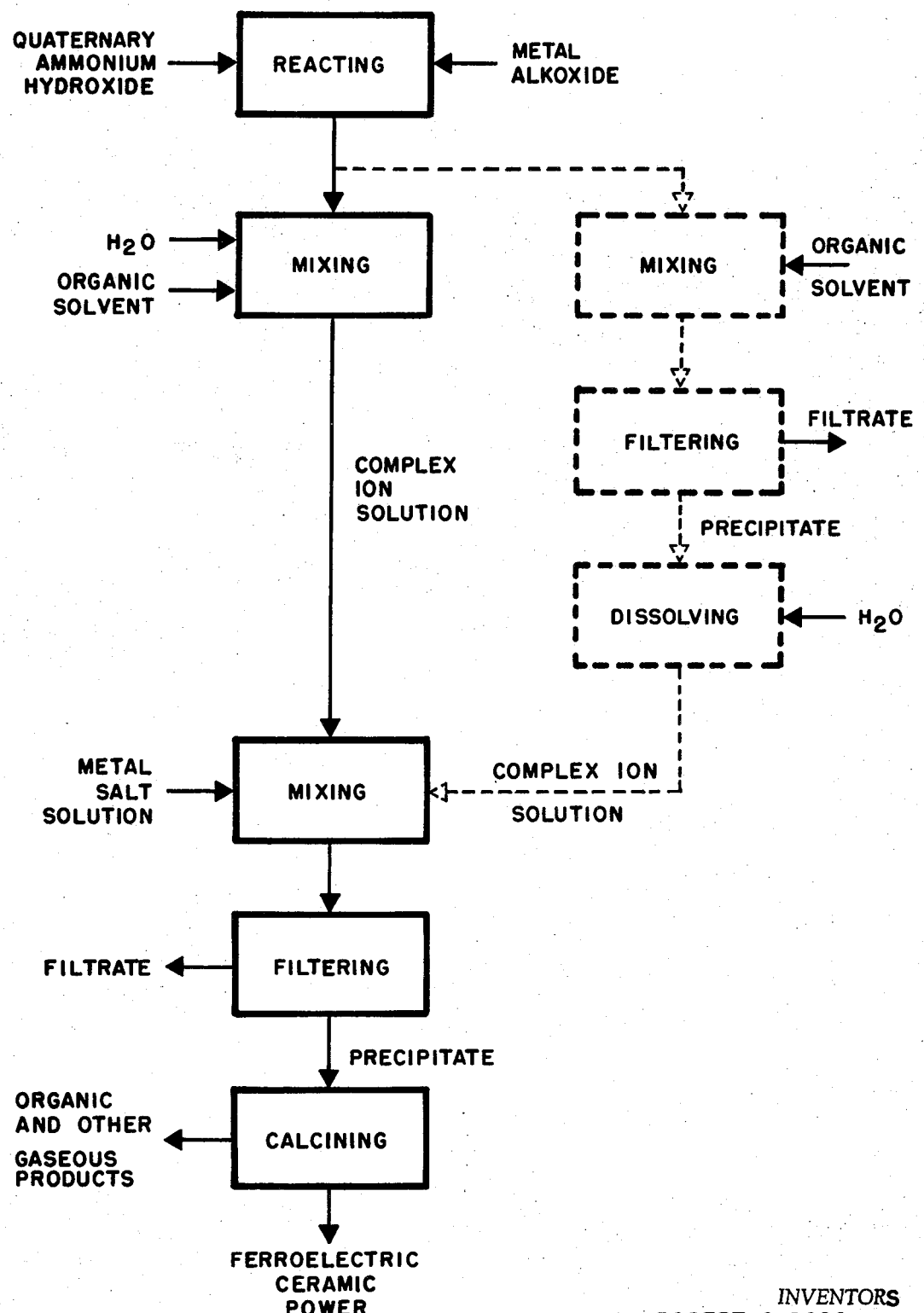

3,699,044
PREPARATION OF FERROELECTRIC
CERAMIC COMPOSITIONS
Robert G. Dosch and William M. O'Neill, Albuquerque, N. Mex., assignors to the United States of America as represented by the United States Atomic Energy Commission
Filed Sept. 16, 1970, Ser. No. 72,707
Int. Cl. C04b 35/00, 33/00
U.S. Cl. 252—62.9
2 Claims

ABSTRACT OF THE DISCLOSURE

Preparation of ferroelectric ceramic, refractory oxide, compositions by mixing a metal alkoxide with a quaternary ammonium hydroxide to obtain a solution containing a soluble metal complex ion, thereafter mixing a metal salt with said solution to form a precipitate, filtering the precipitate and calcining the precipitate to said refractory oxide composition.

BACKGROUND OF INVENTION

Refractory oxides or ceramics, e.g. ferroelectric ceramics, may have a mide range of uses and applications. Areas of particular interest for these materials are as ferroelectric electromechanical transducers and devices, electrical devices and electro-optical memory, display, control or the like devices. It has been found that much more precise and uniform or reproducible devices can be achieved by using homogeneous refractory oxides or ceramics having high purity and uniform small particle size. Prior refractory oxide materials have commonly not had these properites due to limitations inherent in the processes used to prepare the materials.

In some prior processes, commercial grade oxide or carbonate raw materials were physically mixed and calcined to achieve a desired composition. Compositions prepared in such a manner may have widely differing chemical purities, particle size and homogeneity depending upon the chemical purity of and the type of chemical impurities present in the raw materials. Further, this prior process often requires high temperatures to produce the necessary solid state reactions to form the desired compositions which may result in loss of substituents by sublimation as well as cause contamination from surrounding systems. Under some conditions, the physical mixing itself may also contribute to inhomogeneities within the final product.

In another process, a mixture of two or more metal alkoxides were simultaneously hydrolyzed to produce a mixture of refractory oxides. However, with such a process, the alkoxides may have widely differing and varying reaction rates resulting in an inhomogeneous product. Further, many metal alkoxides are chemically unstable and undergo autodecomposition thus limiting the kinds of compositions which can be made by these processes. In addition, all alkoxides readily react with water to varying degrees requiring stringent process controls for many of them.

Other chemical preparation processes or techniques for formulating refractory oxide compositions may utilize chemicals which are difficult to remove from the final product and thus contribute to the impurities included therein.

SUMMARY OF INVENTION

In view of the above, it is an object of this invention to provide a novel process for preparing homogeneous refractory oxide, ferroelectric ceramic, compositions having high purity and uniform small particle size.

It is a further object of this invention to provide a process for preparing such refractory oxide compositions from a wide range of materials.

It is still a further object of this invention to provise a method for preparing refractory oxide compositions which may be processed at lower temperatures.

Various other objects and advantages will appear from the following description of the invention, and the most novel features will be particularly pointed out hereinafter in connection with the appended claims. It will be understood that various changes in the details and materials, which are herein described and illustrated in order to explain the nature of the invention, may be made by those skilled in the art.

The invention comprises mixing metal alkoxides with a quaternary ammonium hydroxide to obtain a solution containing a soluble metal complex ion, mixing a metal salt with said solution to form a precipitate, filtering the precipitate and calcining the precipitate to oxide it to a ferroelectric ceramic composition.

DESCRIPTION OF DRAWING

The drawing is a flow diagram illustrating various steps of the process of this invention.

DETAILED DESCRIPTION

In the process of this invention, as shown in the drawing, a solution containing a metal complex ion of a metal which is to comprise a part of a desired refractory oxide is formed from the reaction of a quaternary ammonium hydroxide with a metal alkoxide and the metal complex ion produced is then reacted with a metal salt solution to form a precipitate which may be calcined to the desired ferroelectric ceramic or refractory oxide composition. It has been found that the quantities of metal alkoxides and metal salt may be selected so as to produce the ferroelectric ceramic with preselected constituent ratios.

To perform this process, a quaternary ammonium hydroxide is first mixed and reacted with a metal alkoxide or a mixture of metal alkoxides to produce one or more soluble metal complex species. Since this mixture is highly basic and since certain metal salts will form insoluble hydroxides in a basic solution, the mixture may be treated in one of two ways depending upon the metal salt to be used. For those metal salts which do not form insoluble hydroxides in a basic solution, the reaction mixture is mixed with water and an organic solvent to form a solution including the metal complex ion or ions. This solution is thereafter mixed with a solution of a metal salt or mixture of metal salts. The metal complex ion and metal ion or other ions then react to form a precipitate comprising a hydroxide of the combined metals in a stoichiometry dependent upon the ratio of the metals used in the various mixtures. The precipitate may then be filtered from the solution and dried and calcined to the ferroelectric ceramic product.

For those metal salts which form insoluble metal hydroxides in basic solution, the reaction mixture of the quaternary ammonium hydroxide and metal alkoxide is first mixed with an organic solvent to produce a metal complex compound precipitate, as shown by the process route illustrated in dotted lines in the drawing. The precipitate is filtered from the mixture and, after suitable drying to remove the filtrate, it is dissolved in water to produce a metal complex ion solution. This solution may then be mixed with the metal salt to react the metal ions thereof, as described above, to form a precipitate which may then be calcined to the ferroelectric ceramic product.

The ferroelectric ceramic product may be used in the powdered form or pressed or sintered at an appropriate pressure and temperature to some desired form or device depending on its intended use.

The ferroelectric ceramic product is in the form of a powder having highly uniform particle size and high homogeneity. Ferroelectric ceramics produced by this process commonly have total impurity levels below about 150 parts per million and a stoichiometry determined by the proportions of starting materials. This purity can be achieved with "off the shelf" raw materials. Even lower levels of impurities may be achieved by controlling the level of impurities of the raw materials. The raw powder generally ranges from about 50 to 200 A. in size. Examples of ferroelectric ceramics which have been made by this process include lead titanate, lead zirconate titanate, lead lanthanium titanate zirconate, barium titanate and the like.

It will be apparent, that with this process, metal salts may be used which would be unstable as alkoxides. Relatively stable alkoxides which do not undergo autodecomposition and which have a reasonable shelf life include alkoxides of titanium, zirconium and niobium. It has been found that the alkoxides of lead, lanthanum and bismuth are sufficiently unstable so that these metals generally should be utilized in this process by addition thereof as a salt as described above.

The metal salt can be any of the salts, such as chlorides or nitrates, though it is preferred that it be a water soluble organic salt such as an acetate or oxalate. An organic salt may be more readily removed from the final product, for example by oxidation during calcination, than can other conventional salts. Metal salts which have been utilized in the process of this invention include those of lead, copper, sodium, nickel, barium, bismuth, cobalt and lanthanum. The process steps shown by dotted lines may generally be used for salts of such metals as copper, nickel and cobalt.

Any suitable quaternary ammonium hydroxide may be used, for example, tetramethylammonium hydroxide and tetrapentylammonium hydroxide, to provide the desired soluble species or complex ion, depending on the particular alkoxides being used. Any appropriate organic solvent may be used, for example acetone and ethanol, though acetone is preferred because the solutions may be more readily filtered.

The complex ion-metal ion reaction product precipitate may be calcined at a temperature determined by the particular composition somewhere between 300° C. and sintering temperatures. The lower the temperature used, the less likely that the particles will be sintered or that substituents will be lost by sublimation or other mechanisms. It has generally been found that most compositions can be calcined at a temperature of about 500° C.

The following are representative examples of process runs used to prepare ferroelectric ceramics in accordance with this invention.

Example I 93.1 grams of tetraisopropyl titanate was mixed and reacted with 1.05 grams pentaethyl niobate and with 107 grams tetramethylammonium hydroxide as a 25% solution in methanol. The reaction mixture was then diluted and mixed with 1200 milliliters of acetone and 1600 milliliters of water to obtain a solution containing a titanium-niobium complex ion. A solution containing 125 grams of lead acetate trihydrate dissolved in 700 milliliters of water was added to the solution containing the complex ion for a reaction of the lead ion therewith. A precipitate was filtered from the solution and calcined at a temperature of 500° C. to form 100 grams of niobium doped lead titanate powder. The niobium doped lead titanate powder ($Pb_{.995} Ti_{.99} Nb_{.01} O_3$) produced was stoichiometric and made up of uniform small particles about 50 A. in size.

Example II 32.7 grams of tetraisopropyl titanate was added to 200 grams of a 25% by weight solution of tetramethylammonium hydroxide in methanol. This mixture was diluted with 500 milliliters of acetone and by 600 milliliters of water to obtain a solution containing a titanium complex ion. This solution was then stirred rapidly and 43.6 grams of lead acetate trihydrate as an aqueous solution containing 100 to 150 grams of lead acetate trihydrate per liter was slowly added thereto and the lead ion reacted with the complex ion. The precipitate formed from the reaction was collected by filtration, washed with water and acetone and converted to lead titanate powder ($PbTiO_3$) by calcination of 500° C.

Example III

A mixture of 76.1 grams of tetrabutyl zirconate and 30.0 grams of tetraisopropyl titanate was added to 600 grams of a 25% by weight solution of tetrabutylammonium hydroxide in methanol. The reaction mixture was then diluted by the addition of 1500 milliliters of acetone followed by 1800 milliliters of distilled water. The solution was then stirred rapidly and 114.51 grams of lead acetate trihydrate, as an aqueous solution containing 100 to 150 grams of lead acetate trihydrate per liter, was then slowly added and the metal ion and complex ion reacted together. The precipitate which was formed was collected by filtration, washed with water and acetone and converted to lead zirconate titanate ($Pb(Zr_{.65}Ti_{.35})O_3$) by calcination at 500° C.

Example IV

Tetraisopropyl titanate was mixed and reacted with tetramethylammonium hydroxide as a 25% solution in methanol. The resulting solution was mixed with acetone to form a precipitate. The precipitate was filtered and washed and dissolved in water. This solution was mixed with a lead acetate trihydrate solution and the resulting precipitate filtered and calcined to lead titanate.

What is claimed is:

1. Process for preparing ferroelectric ceramic, metal oxide solid solution composition comprising:
    (a) first mixing and thereby reacting a metal alkoxide of a first metal selected from the group consisting of titanium, zirconium and niobium with a quaternary ammonium hydroxide in non-aqueous medium,
    (b) then mixing the reaction product thereof with an organic solvent selected from the group consisting of ethanol and acetone to obtain a metal complex compound precipitate,
    (c) filtering the precipitate and dissolving the precipitate in water to obtain a solution containing a water soluble metal complex of said first metal,
    (d) thereafter mixing a metal salt solution of a second metal different from said first metal and selected from the group consisting of titanium, zirconium, lead, lanthanum, bismuth, copper, nickel, barium and cobalt with said metal complex ion containing solution to form a precipitate,
    (e) filtering the precipitate and calcining the precipitate at about 500° C. in an oxygen containing atmosphere to oxidize said precipitate to said ferroelectric ceramic composition and to burn off any residual organic materials, 2. Process for preparing ferroelectric ceramic, metal oxide solid solution composition comprising,
    (a) first mixing and thereby reacting a metal alkoxide of a first metal selected from the group consisting of titanium, zirconium, and niobium with a quaternary ammonium hydroxide in non-aqueous medium and an organic solvent selected from the group consisting of ethanol and acetone to obtain a metal complex compound precipitate,
    (b) then filtering the precipitate and dissolving the precipitate in water to obtain a solution containing a water soluble metal complex ion of said first metal,
    (c) thereafter mixing a metal salt solution of a second metal different from said first metal and selected from the group consisting of titanium, zirconium, lead, lanthanum, bismuth, copper, nickel, barium and cobalt with said metal complex ion containing solution to form a precipitate, (d) filtering the precipitate and calcining the precipitate at about 500° C. in an oxygen containing atmosphere to oxidize said precipitate to said ferroelectric ceramic composition and to burn off any residual organic materials.

References Cited

UNITED STATES PATENTS

| | | | |
|---|---|---|---|
| 3,137,742 | 6/1964 | Sowden et al. | 106—39 R |
| 3,413,083 | 11/1968 | Daendliker | 23—51 R |
| 3,066,048 | 11/1962 | Mitchell | 106—39 R |
| 3,025,173 | 3/1962 | Bernstein | 106—308 B |
| 3,330,697 | 7/1967 | Pechini | 117—215 |

FOREIGN PATENTS

| | | | |
|---|---|---|---|
| 1,286,038 | 1/1969 | Germany | 106—39 R |

TOBIAS E. LEVOW, Primary Examiner

W. R. SATTERFIELD, Assistant Examiner

U.S. Cl. X.R.

106—39 R; 117—100 B; 252—520; 264—61; 106—55, 57